United States Patent
Vaishnav et al.

(10) Patent No.: US 10,969,478 B2
(45) Date of Patent: Apr. 6, 2021

(54) VEHICLE OBJECT-DETECTION SENSOR SYSTEM

(71) Applicant: Ford Global Technologies, LLC, Dearborn, MI (US)

(72) Inventors: Dhaval P. Vaishnav, Canton, MI (US); Yi-Hsin Yen, Canton, MI (US); Syed K. Ali, Dearborn, MI (US); Andre Sykula, Sterling Heights, MI (US); Venkatesh Krishnan, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 549 days.

(21) Appl. No.: 15/861,612

(22) Filed: Jan. 3, 2018

(65) Prior Publication Data
US 2019/0204426 A1    Jul. 4, 2019

(51) Int. Cl.
| | |
|---|---|
| *G01S 7/497* | (2006.01) |
| *G01S 7/481* | (2006.01) |
| *G01S 17/04* | (2020.01) |
| *G01S 17/86* | (2020.01) |
| *G01S 17/931* | (2020.01) |
| *H04N 7/18* | (2006.01) |
| *G01S 13/931* | (2020.01) |

(52) U.S. Cl.
CPC .......... *G01S 7/497* (2013.01); *G01S 7/4813* (2013.01); *G01S 17/04* (2020.01); *G01S 17/86* (2020.01); *G01S 17/931* (2020.01); *G01S 13/931* (2013.01); *G01S 2007/4977* (2013.01); *G01S 2013/9323* (2020.01); *G01S 2013/93273* (2020.01); *H04N 7/181* (2013.01)

(58) Field of Classification Search
CPC ...... G01S 7/484; G01S 17/931; G01S 7/4813; G01S 7/4815; G01S 7/4861; G01S 17/10; G01S 17/89; H04N 5/2252; H04N 7/183; B60S 1/56; B60S 1/04; G02B 27/0006
See application file for complete search history.

(56) References Cited

U.S. PATENT DOCUMENTS

| | | | | |
|---|---|---|---|---|
| 3,917,382 | A * | 11/1975 | Amann | .................... G09F 11/29 359/507 |
| 9,880,382 | B1 * | 1/2018 | Tippy | .................... H04N 5/2252 |
| 2016/0244028 | A1 | 8/2016 | Wakatsuki | |
| 2017/0210351 | A1 * | 7/2017 | Ghannam | ................ B60S 1/50 |

(Continued)

FOREIGN PATENT DOCUMENTS

| | | |
|---|---|---|
| DE | 102006054639 A1 | 9/2009 |
| DE | 102013012522 A1 | 1/2015 |

(Continued)

*Primary Examiner* — Luke D Ratcliffe
(74) *Attorney, Agent, or Firm* — Frank A. MacKenzie; Bejin Bieneman PLC

(57) ABSTRACT

A system includes a base having a sensor opening. An object-detection sensor is aligned with the sensor opening. A motor and a guide are each supported by the base and are spaced from each other. A continuous band is flexible relative to and engaged with the motor and the guide. At least a portion of the continuous band is transparent and extends between the sensor and the sensor opening. If a contaminant, e.g., dirt, water, snow, etc., is on the continuous band at the sensor opening, the motor moves the continuous band to locate a clean section of the continuous band at the opening.

20 Claims, 6 Drawing Sheets

(56) References Cited

U.S. PATENT DOCUMENTS

2017/0244873 A1\* 8/2017 Izabel .................... B60R 11/04
2018/0134234 A1\* 5/2018 Nickolaou ........... G03B 17/561

FOREIGN PATENT DOCUMENTS

| DE | 102016006039 A1 | 11/2016 |
| DE | 102016008064 A1 | 12/2016 |
| GB | 2535862 A | 8/2016 |

\* cited by examiner

VEHICLE OBJECT-DETECTION SENSOR SYSTEM

BACKGROUND

Vehicles, such as autonomous vehicles, typically include a variety of sensors. Some sensors detect internal states of the vehicle, for example, wheel speed, wheel orientation, and engine and transmission variables. Some sensors detect the location and/or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors object-detection sensors that detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
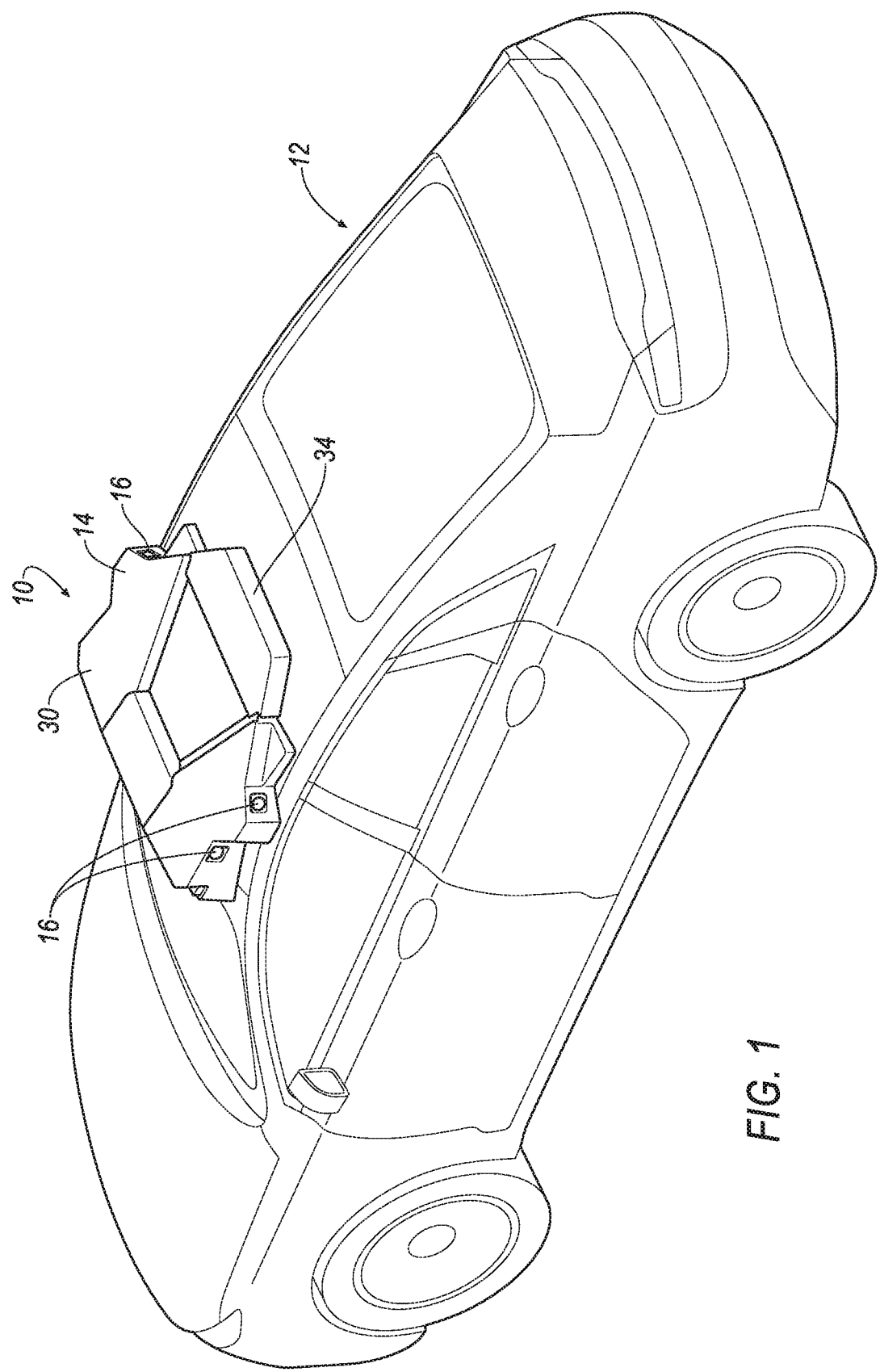
FIG. 1 is a perspective view of a vehicle with a system including a base supporting object-detection sensors.

A system includes a base having a sensor opening, and an object-detection sensor aligned with the sensor opening. A motor and a guide are each supported by the base and are spaced from each other. A continuous band is flexible relative to and engaged with the motor and the guide. At least a portion of the continuous band is transparent and extends between the sensor and the sensor opening.

The system may include a fluid nozzle supported by the base. A pad may contact the continuous band. The motor is configured to drive the continuous band in an advancing direction, and the pad is positioned in the advancing direction relative to the fluid nozzle.

The continuous band may includes an inner surface and an outer surface, the inner surface facing the object-detection sensor and the outer surface facing the fluid nozzle. The pad may contact the outer surface of the continuous band.

The fluid nozzle may face inwardly into the base.

The pad may contact the continuous band.

The continuous band may extend around the driver and the guide.

The object-detection sensor may be supported by the base.

The base may have a second sensor opening spaced from the sensor opening, and a second object-detection sensor may be aligned with the second sensor opening.

At least one of the motor and the guide may be biased toward the continuous band.

The base may define a slot elongated in a direction transverse to the continuous band. One of the motor and the guide may engaged with the slot, and a spring may bias the one of the motor and the guide along the slot toward the continuous band.

The system may include a seal along the sensor opening and extending between the base and the continuous band. The sensor opening may defines a periphery, and the seal may extend continuously around the periphery. The base may include a lip that extends from the seal to the sensor opening.

The guide may include a curved surface, and the continuous band may abut the curved surface. The base may include an interior surface, and at least a portion of the curved surface of the guide may match the shape of the interior surface.

The guide may be a post that is rotatable relative to the base, and the continuous band may abut the post.

The system may include a liquid reservoir and a pump in communication with the liquid reservoir, and a computer programmed to control the motor and the pump based on a measurement of contamination of the continuous band.

With reference to the Figures, wherein like numerals indicate like parts throughout the several views, a system 10 for a vehicle 12 includes a base 14 having a sensor opening 16. An object-detection sensor 18 is aligned with the sensor opening 16. A motor 20 and a guide 22 are each supported by the base 14 and are spaced from each other. A continuous band 24 is flexible relative to and engaged with the motor 20 and the guide 22. At least a portion of the continuous band 24 is transparent and extends between the sensor and the sensor opening 16.

The motor 20 selectively moves the continuous band 24 across the sensor opening 16 to maintain a clear field of view for the object-detection sensor 18 through the sensor opening 16. For example, if a contaminant, e.g., dirt, water, snow, etc., is on the continuous band 24 at the sensor opening 16, the motor 20 moves the continuous band 24 to locate a clean section of the continuous band 24 at the opening. Since the continuous band 24 is flexible relative to the motor 20 and the guide 22, the continuous band 24 can follow the contours of the base 14 as the motor 20 drives the continuous band 24.

The vehicle 12 may be an autonomous vehicle. The vehicle 12 may include a computer 26 configured to operate the vehicle 12 independently of the intervention of a human driver, completely or to a lesser degree. The computer 26 may be programmed to operate the propulsion, brake system, steering, and/or other vehicle 12 systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

With reference to FIG. 1, the system 10 may be mounted to a roof of the vehicle 12. Alternatively, the system 10 may be mounted to any suitable location of the vehicle 12.

Figure 2:
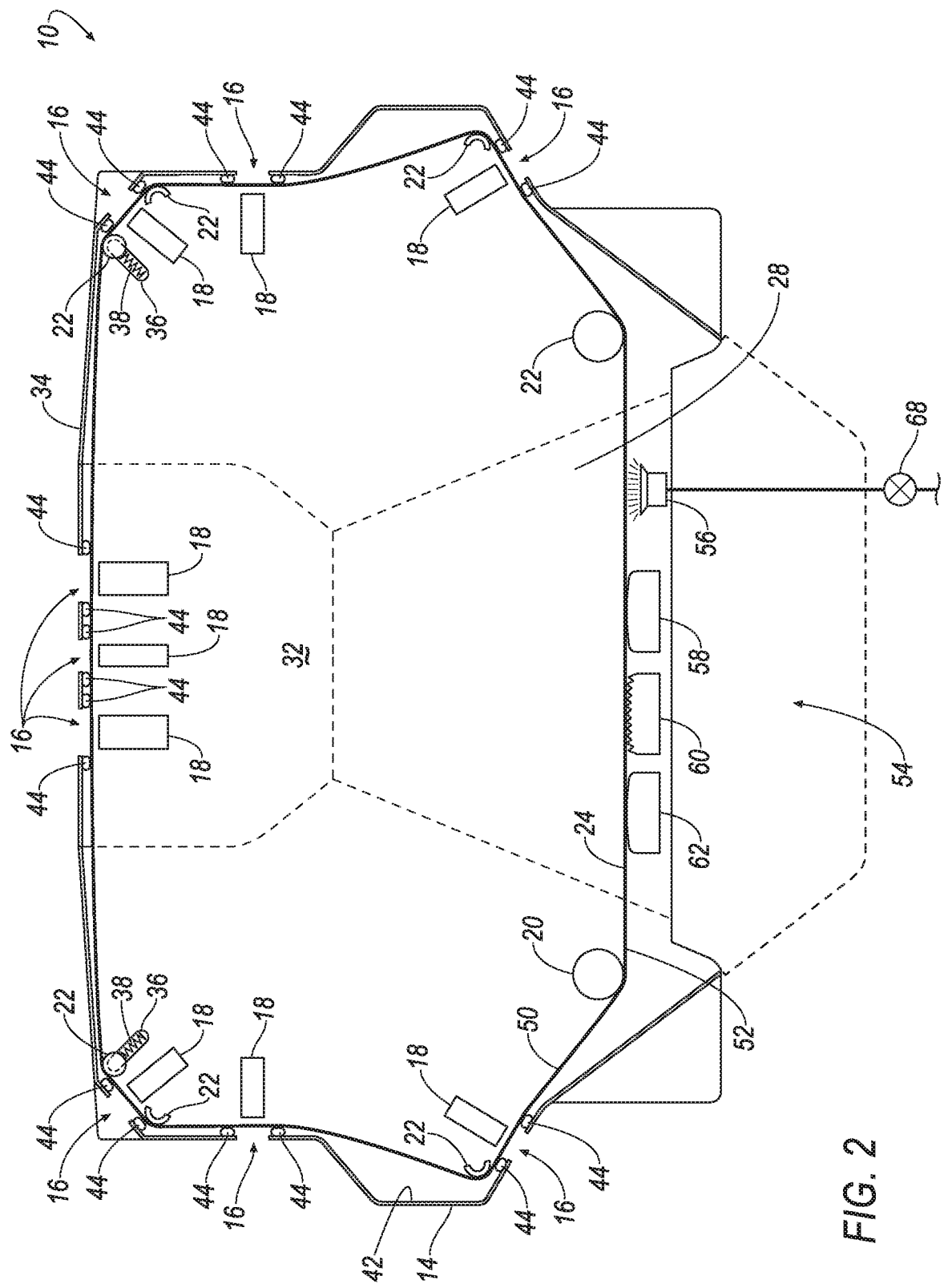
FIG. 2 is a cross-sectional view through the base.

With reference to FIG. 2, the base 14 defines a chamber 28. For example, the base 14 may include walls 34, a top panel 30 (identified in FIG. 1), a bottom panel 32, etc., to enclose the chamber 28 and protect components therein from conditions such as rain, snow, dirt, etc. The chamber 28 may be partially or completely enclosed by the base 14. The base 14 may be a component of the vehicle 12, or may be connected to the vehicle 12.

Figure 3:
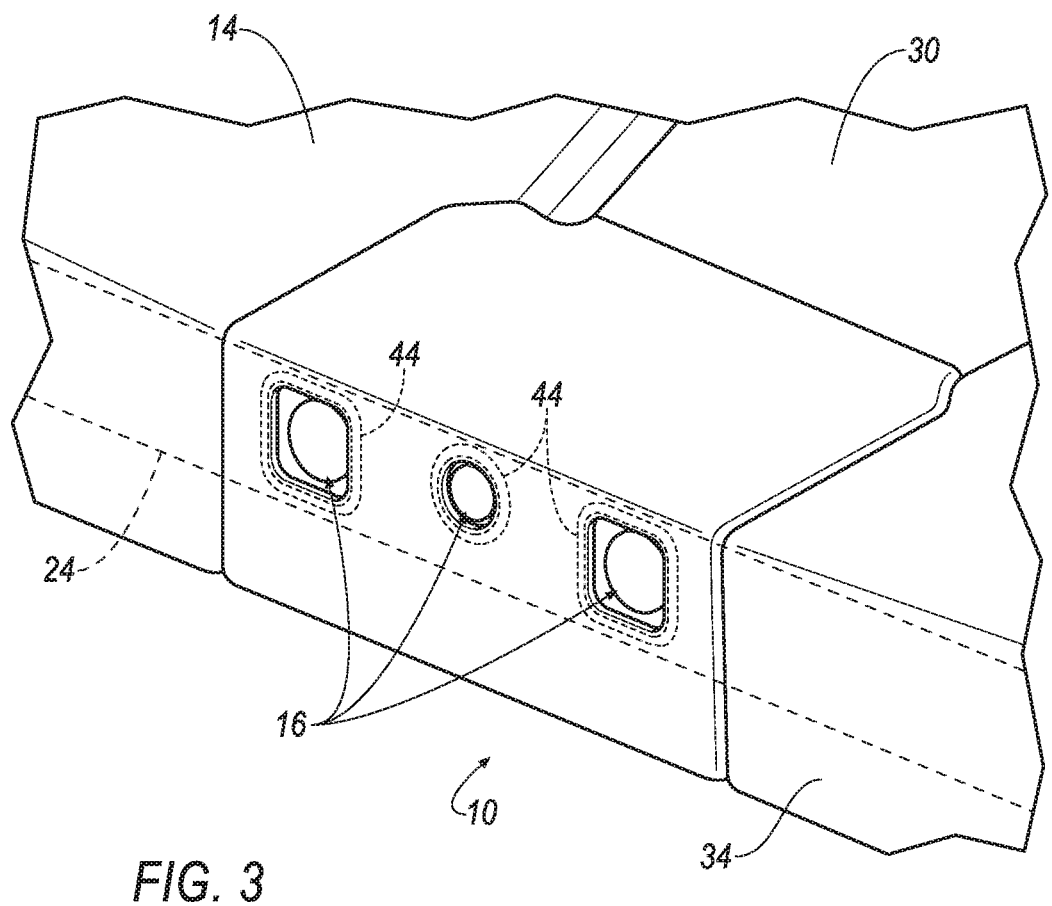
FIG. 3 is a perspective view of a portion of the base and some of the object-detection sensors.

The base 14 has at least one sensor opening 16. For example, as shown in FIGS. 2 and 3, the base 14 may include a plurality of sensor openings 16 spaced from each other, i.e., the walls 34 of the base 14 separate the sensor openings 16. Said differently, the plurality of sensor openings 16 may include a first sensor opening 16, a second sensor opening 16, etc., where the adjectives "first," "second," etc., are used merely as identifiers and do not indicate order or importance. In examples where the base 14 includes a plurality of sensor openings 16, the sensor openings 16 may face in the same or in different directions. Each sensor opening 16 permits light to pass there through.

As set forth above, the motor 20 is supported by the base 14. As an example, the motor 20 may be mounted to the bottom panel 32 of the base 14. In any event, the motor 20 is fixed relative to the base 14 and drives movement of the continuous band 24.

As set forth above, the motor 20 engages the continuous band 24. In other words, the motor 20 interacts with the continuous band 24 in a way suitable to drive movement of the continuous band 24. The motor 20 is configured to drive the continuous band 24 in an advancing direction. As an example, the motor 20 may include a component that directly contacts the continuous band 24 to impart movement to the continuous band 24. As an example, the motor 20 may include a drive wheel that imparts movement to the continuous band 24 by friction between drive wheel and the continuous band 24. In such an example, the drive wheel may include a polymeric outer coating to enhance friction between the drive wheel and the continuous band 24. As another example, the drive wheel may include teeth, and the continuous band 24 may include holes spaced longitudinally along the continuous band 24 and configured to engage the teeth as the drive wheel rotates.

The motor 20 may be of any suitable type. As an example, the motor 20 may be an electric motor. The motor 20 is a rotational motor, i.e., produces rotary force, in other words, torque. The motor 20 transmits torque to the continuous band 24, as described above. For example, in examples that include the drive wheel described above, the motor 20 rotates the drive wheel. The system 10 may include one motor 20, as shown in FIG. 2, or may include any suitable number of motors 20.

As set forth above, the guide 22 is supported by the base 14 and is spaced from the motor 20. With reference to FIG. 2, the system 10 may include a plurality of guides 22 each supported by the base 14, each spaced from each other, and each spaced from the motor 20. The system 10 may include any suitable number of guides 22, i.e., one or more. As described further below, in examples that include a plurality of guides 22, the guides 22 may be identical or different from each other. As set forth above, the continuous band 24 is flexible relative to the guide 22. In other words, each guide 22 is rigid relative to the continuous band 24. The continuous band 24 is wrapped around the guides 22, and the guides 22 direct the path of the continuous band 24.

At least one of the motor 20 and the guide 22 are biased toward the continuous band 24. In the example in FIG. 2, two of the guides 22 are biased toward the continuous band 24. By being biased toward the continuous band 24, the motor 20 and guides 22 create tension in the continuous band 24 to keep the continuous band 24 flat across the sensor openings 16 and to optimally transfer movement from the motor 20 to the continuous band 24. The material and dimensions of the continuous band 24 may be suitable to avoid breakage of the continuous band 24 caused by the tension in the continuous band 24. As an example, FIG. 2 shows the two biased guides 22 biasing the continuous band 24 radially outwardly relative to the base 14. In other examples, one or more guides 22 may bias the continuous band 24 radially inwardly relative to the base 14.

With reference to FIG. 2, the base 14 may define a slot 36 elongated in a direction transverse to the continuous band 24. One of the motor 20 and the guide 22 is slideably engaged with the slot 36 and is slideable relative to the base 14 along the slot 36. For example, in the example of FIG. 2, two of the guides 22 are slideably engaged in slots 36. With continued reference to the example in FIG. 2, a spring 38 biases the guide 22 along the slot 36 toward the continuous band 24. The spring 38 may be in the slot 36, and may be retained in the slot 36 in any suitable fashion. In examples where the motor 20 is biased toward the continuous band 24, the motor 20 may be slideable along the slot 36 and spring 38 may bias the motor 20.

Figure 4:
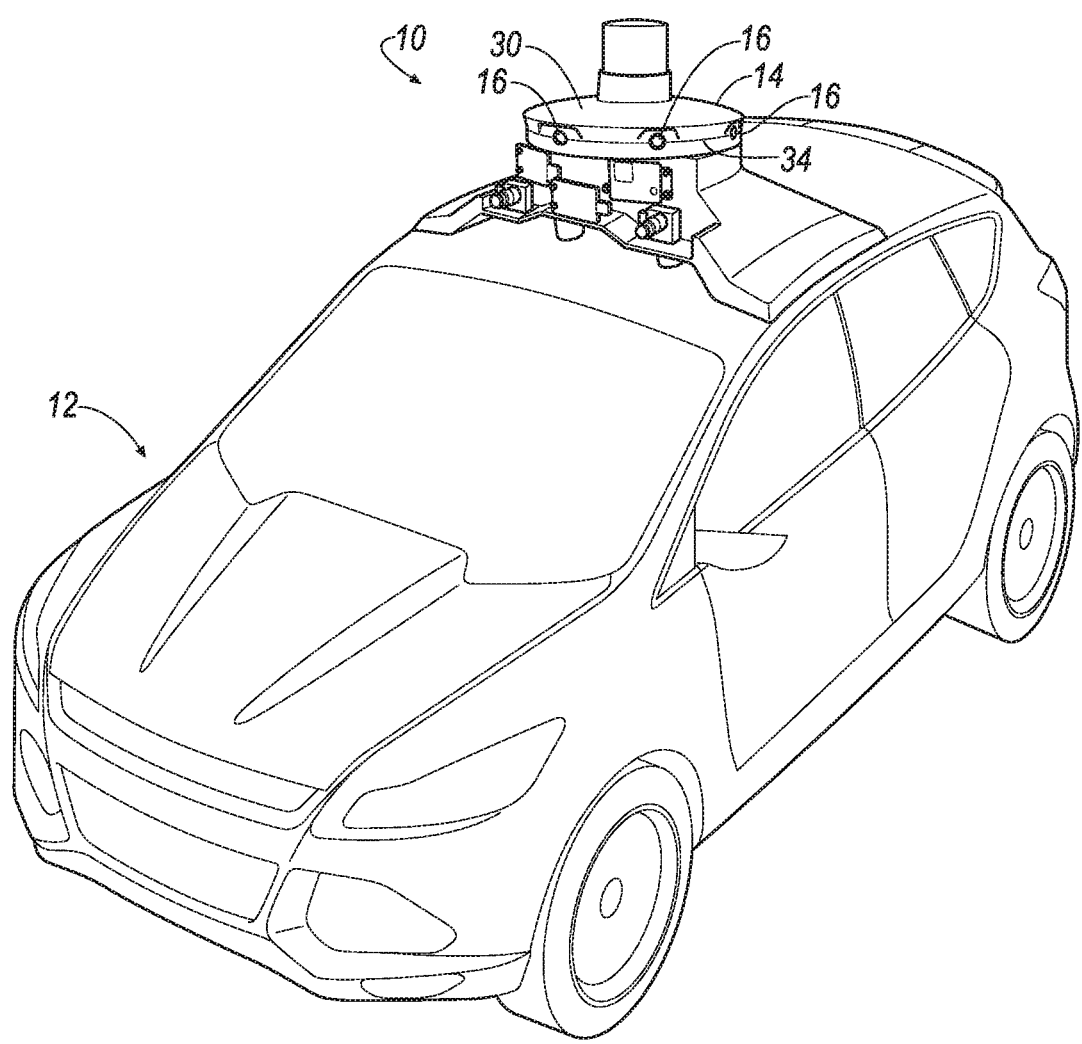
FIG. 4 is a perspective view of a vehicle with another embodiment of the system including a base having a different shape than FIG. 1.
Figure 5:
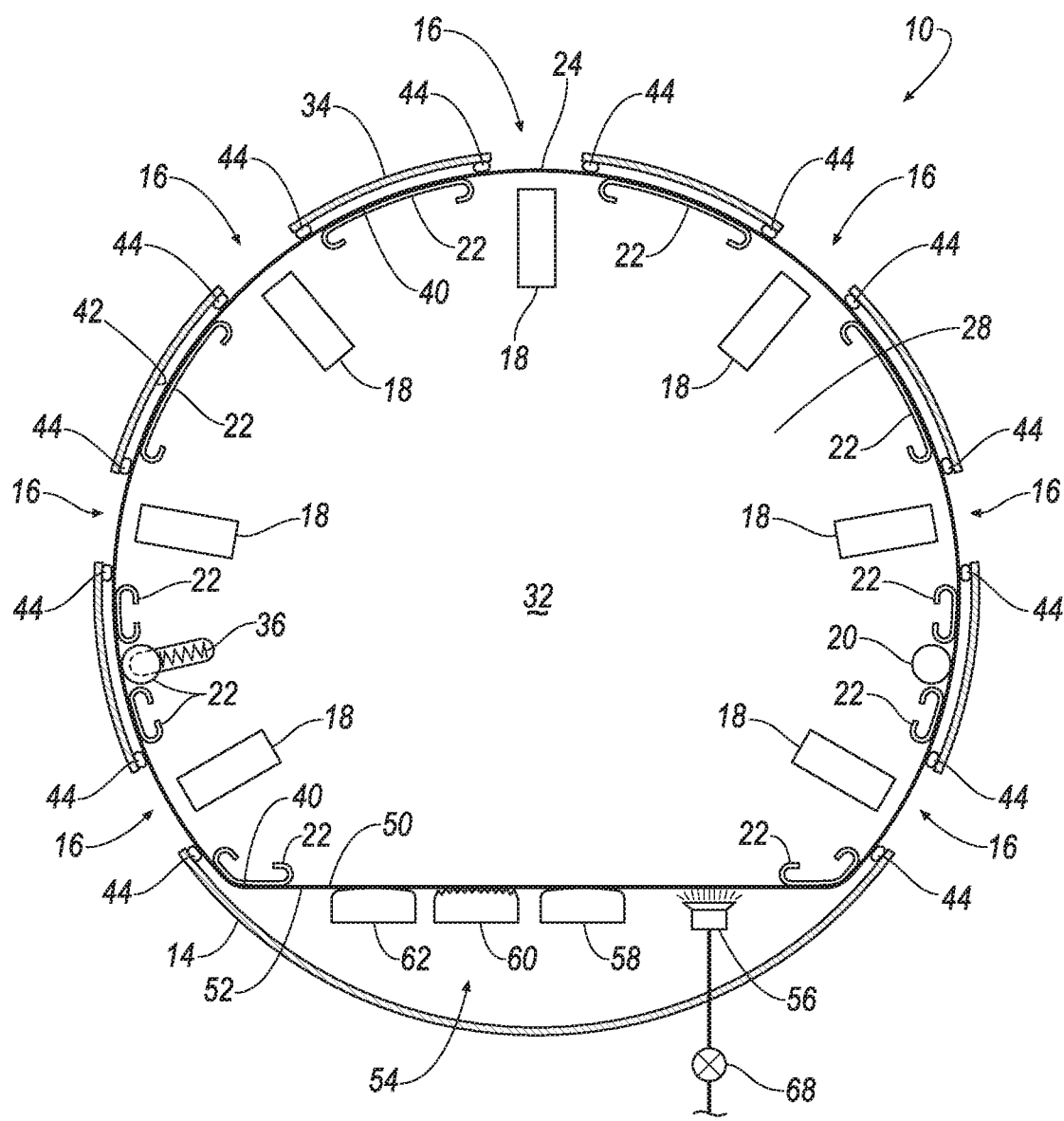
FIG. 5 is a cross-sectional view through the base of FIG. 4.

One embodiment of the base 14 is shown in FIGS. 1 and 2, and another embodiment of the base 14 is shown in FIGS. 4 and 5. The system 10 including the base 14 shown in FIGS. 1 and 2 may operate identical to the system 10 including the base 14 shown in in FIGS. 4 and 5, with the difference in the shape of the base 14. In the alternative, the base 14 may have any suitable shape.

With reference to FIGS. 2 and 5, the guides 22 may have any suitable shape to smoothly guide 22 the shape and motion of the continuous band 24. As examples, the guides 22 may be partial-cylinders (as shown in some examples in FIG. 2), posts (as shown in some examples of FIGS. 2 and 5), or may be elongated (as shown in some examples of FIG. 5). In the event that the guides 22 are posts, the posts may rotate relative to the base to decrease friction between the post and the continuous band 24. In such an example, the post includes a curved surface, e.g., a round surface, and the continuous band 24 abuts the round surface.

With reference to FIGS. 2 and 5, the guides 22 may include a curved surface 40, and the continuous band 24 may abut the curved surface 40. The shape of the curved surface 40 may reduce friction between the guide 22 and the continuous band 24, and may reduce the likelihood that the guide 22 damage the continuous band 24 as the continuous band 24 moves over the guide 22.

With reference to FIG. 5, the base 14 may include an interior surface 42, and at least a portion of the curved surface 40 of the guide 22 matches the shape of the interior surface 42. This configuration allows at least a portion of the continuous band 24 to be arranged in a generally circular route to cover sensor openings 16 arranged in a circular pattern, as shown in the example in FIG. 5.

With continued reference to FIGS. 2-5, the object-detection sensor 18 may detect the external world. For example, the object-detection sensor 18 may be a radar sensor, scanning laser range finder, light detection and ranging (LIDAR) device, or image processing sensor such as a camera. The sensor has a field of view (i.e., the domain in which the sensor can detect phenomena such as light, sound, etc.) beginning at and outward from the sensor opening 16.

With continued reference to FIGS. 2-5, the object-detection sensor 18 may be a scanning laser range finder, a light detection and ranging (LIDAR) device, an image processing sensor such as camera, or any other sensor that detects light. The object-detection sensor 18 may generate data representing an image captured by the object-detection sensor 18. The sensor has a field of view (i.e., the domain in which the sensor can detect phenomena such as light, sound, etc.) beginning at and outward from the sensor opening 16.

As set forth above, the object-detection sensor 18 is aligned with the sensor opening 16. In other words, the object-detection sensor 18 is positioned to receive light through the sensor opening 16. At least a portion of the field of view of the sensor is aimed at through the sensor opening 16.

The field of view of the sensor is directed through the continuous band 24 at the sensor opening 16. As set forth above, the continuous band 24 is transparent, i.e., is transparent to the sensor. Specifically, the continuous band 24 is transparent with respect to whatever medium the object-detection sensor 18 is capable of detecting. For example, if the object-detection sensor 18 is a camera, then the continuous band 24 is transparent with respect to visible light. As another example, if the object-detection sensor 18 is a LIDAR device, then the continuous band 24 is transparent with respect to visible light at the wavelength of the laser pulses generated by the object-detection sensor 18. A portion of the continuous band 24, or the entire continuous band 24, is transparent. As an example, a top portion and a bottom portion of the continuous band 24 may be opaque, and a middle portion of the continuous band 24 along the entire length of the continuous band 24 between the top portion and the bottom portion may be transparent.

The object-detection sensor 18 is supported by the base 14. For example, the object-detection sensor 18 may be secured to the bottom panel 32, one of the walls 34, etc., e.g., with an adhesive, one or more fasteners, etc. The object-detection sensor 18 is disposed within the chamber 28.

Figure 6:
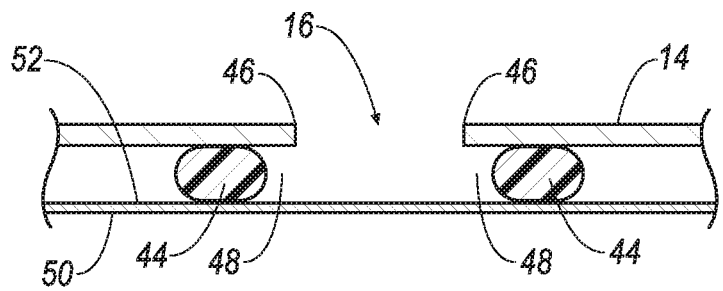
FIG. 6 is a cross-sectional view of a portion of the base showing a continuous band and a seal between the base and the continuous band.

With reference to FIGS. 3 and 6, a seal 44 is disposed along the sensor opening 16, and the seal 44 extends between the base 14 and the continuous band 24. Specifically, the sensor opening 16 defines a periphery, and the seal 44 may extend continuously around the periphery to prevent air flow and/or contaminants from entering the chamber 28 through the sensor opening 16. The seal 44 may be of any suitable material, e.g., rubber, cellular, sponge, etc.

With reference to FIG. 6, in one example, the base 14 may include a lip 46 that extends from the seal 44 to the sensor opening 16. A space 48 is defined between the lip 46 and the continuous band 24. The space 48 may collect contaminants as the continuous band 24 is driven by the motor 20 to prevent build-up of the contaminants on the edge of the sensor opening 16, which may be in the field of view of the object-detection sensor 18. As another example, the seal 44 may be at the sensor opening 16, in which case the seal 44 may act as a wiper to wipe the contaminants from the continuous band 24. In another example, a wiper, in addition to the seal 44, may be disposed between sensor opening 16 and the seal 44 to wipe contaminants from the continuous band 24.

The continuous band 24 is continuous in that the continuous band 24 extends in a one-piece, uninterrupted loop. Accordingly, when the motor 20 drives the continuous band 24, the continuous band 24 is driven around the guides 22. At least a portion of the continuous band 24 is transparent and positioned to cover the sensor openings 16 so as to not obstruct the field of view of the sensors. The continuous band 24 may have a width suitable to completely cover each sensor opening 16. The continuous band 24 may have any suitable thickness and, for example, may be a film or otherwise may be very thin relative to the width of the continuous band 24. The continuous band 24 may be formed of any suitable material, e.g., a plastic.

The continuous band 24 includes an inner surface 50 and an outer surface 52. The inner surface 50 faces the object-detection sensor 18, and the outer surface 52 faces the sensor opening 16.

With reference to FIGS. 2 and 5, the system 10 includes a cleaning mechanism 54 in the chamber 28 of the base 14. The cleaning mechanism 54 may include a fluid nozzle 56 and/or one or more pads 58, 60, 62 supported by the base 14.

Figure 7:
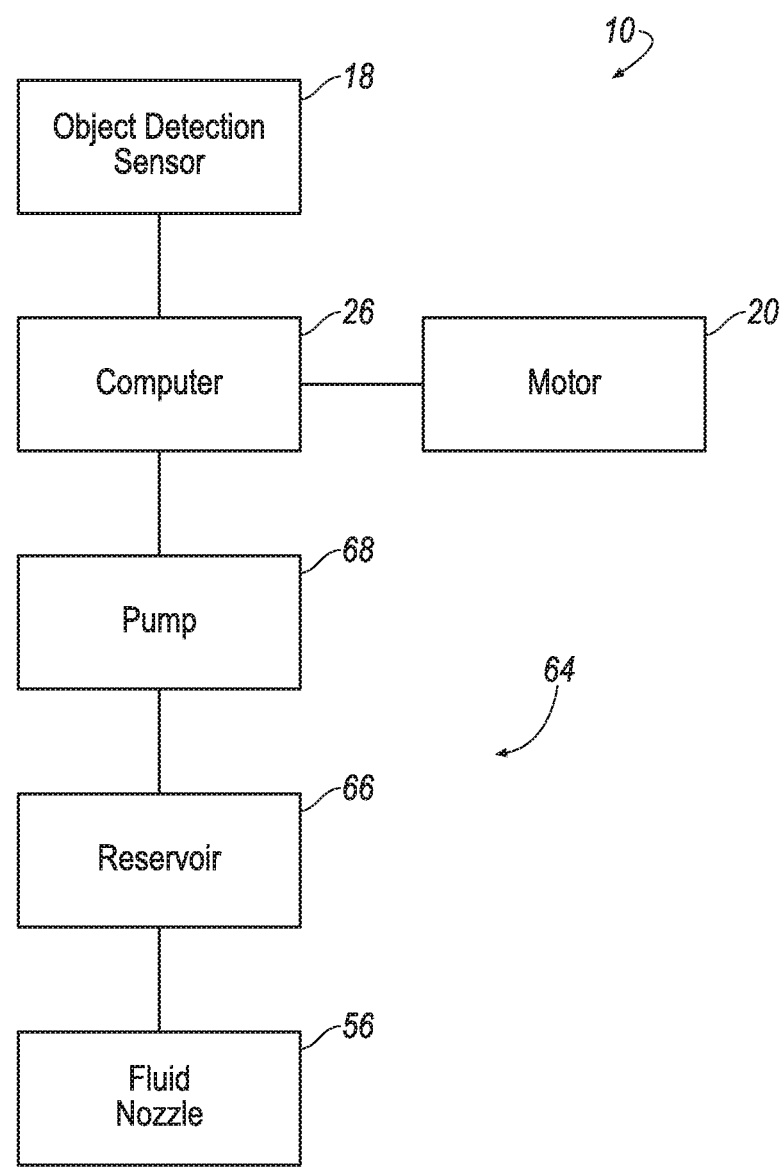
FIG. 7 is a schematic of the system.

The fluid nozzle 56 is disposed in the chamber 28. The fluid nozzle 56 faces inwardly into the base 14 and is aimed at the continuous band 24. Specifically, the fluid nozzle 56 faces the outer surface 52 of the continuous band 24. With reference to FIG. 7, the system 10 includes a fluid system 64 that includes a reservoir 66, a pump 68, and the cleaning mechanism 54 in fluid communication with the reservoir 66, e.g., through the pump 68. The fluid system 64 may distribute washer fluid stored in the reservoir 66 to the fluid nozzle 56. "Washer fluid" refers to any liquid stored in the reservoir 66 for cleaning. The washer fluid may include solvents, detergents, diluents such as water, etc. Alternatively or additionally, the fluid system 64 may distribute compressed air through the fluid nozzle 56.

The fluid nozzle 56 is fluidly connected to the pump 68 and/or an air compressor (not shown). The fluid nozzle 56 may be supported by and protrude from the bottom panel 32. For example, the fluid nozzle 56 may be adhered, fastened, etc. to the bottom panel 32. Specifically, the fluid nozzle 56 may be fixedly positioned to eject washer fluid or compressed air at the outer surface 52 of the continuous band 24 to clean contaminants from the continuous band 24. Although a single fluid nozzle 56 is shown in FIGS. 2 and 5, the system 10 may include any suitable number of fluid nozzles 56, i.e., one or more.

The reservoir 66 may be a tank fillable with liquid, e.g., washer fluid for window cleaning. The reservoir 66 may be disposed in a front end of the vehicle 12, specifically, in an engine compartment forward of a passenger cabin. The reservoir 66 may store the washer fluid only for supplying the sensor assembly or also for other purposes, such as supply to a windshield.

The pump 68 selectively forces the washer fluid from the reservoir 66 to the fluid nozzle 56, e.g., through a supply line, with sufficient pressure that the washer fluid sprays from the fluid nozzle 56. The pump 68 is fluidly connected to the reservoir 66. The pump 68 may be attached to or disposed in the reservoir 66.

With continued reference to FIGS. 2 and 5, the pad 58, 60, 62 contacts the continuous band 24 and, more specifically, contacts the outer surface 52 of the continuous band 24. Accordingly, as the motor 20 drives the continuous band 24, the pad 58, 60, 62 cleans contaminants from the continuous band 24.

As set forth above, the motor 20 is configured to drive the continuous band 24 in an advancing direction. The pad 58, 60, 62 is positioned in the advancing direction relative to the fluid nozzle 56. Accordingly, fluid may be applied to the continuous band 24 with the fluid nozzle 56, and subsequently wiped from the continuous band 24 with the pad 58, 60, 62 as the motor 20 drives the continuous band 24 in the advancing direction.

As shown in FIGS. 2 and 5, the system 10 may include a plurality of pads 58, 60, 62. Each of the pads 58, 60, 62 may be identical to each other or different from each other. As an example, one of the pads, e.g., pad 58, may be foam or rubber; one of the pads, e.g., pad 60, may include an abrasive surface, i.e., may be a cleaning pad; and one of the pads, e.g., pad 62, may be cellular, e.g., a sponge, i.e., may be a drying pad. In such a configuration, the pad 58 may wipe dust from the continuous band 24, the pad 60 may remove difficult to remove contaminants such as dead bugs, and the pad 62 may absorb moisture.

By moving the continuous band 24 relative to the fluid nozzle 56, the same fluid nozzle(s) 56 provide cleaning capabilities for each of the object-detection sensors 18. This configuration reduces the overall number of fluid nozzles and fluid lines. By reducing the overall number of fluid nozzles and fluid lines, the consumption of washer fluid is minimized, thus reducing the size of the reservoir 66.

With reference to FIG. 7, the vehicle 12 may include a computer for controlling the system 10. The computer 26 may be a microprocessor-based computer implemented via circuits, chips, or other electronic components. For example, the computer 26 may include a processor, a memory, etc. The memory of the computer 26 may include memory for storing programming instructions executable by the processor as well as for electronically storing data and/or databases. The computer 26 is generally configured for communications with vehicle 12 components, on a controller area network (CAN) bus, e.g., the in-vehicle 12 communication network, and for using other wired or wireless protocols to communicate with devices outside the vehicle 12, e.g., Bluetooth®, IEEE 802.11 (colloquially referred to as WiFi), satellite telecommunication protocols, and cellular protocols such as 3G, LTE, etc. Via the in-vehicle 12 communication network the computer 26 may transmit and/or receive messages, data, instructions, etc., to and/or from various devices in the vehicle 12, e.g., the object-detection sensor 18, the motor 20, the pump 68, etc. Although one computer 26 is shown in FIG. 7 for ease of illustration, it is to be understood that the computer 26 could include, and various operations described herein could be carried out by, one or more computing devices.

The computer 26 may be programmed to control the motor 20 and the pump 68 based on a measurement of contamination of the continuous band 24. For example, the computer 26 may compare images received from the object-detection sensor 18 with each other and identify an artifact that is consistent among the images, e.g., contamination on the continuous band 24 at a sensor opening 16, will appear in a consistent location on the images while a remainder of the image will change. Upon identification of a threshold amount, e.g., a number, a total area, etc., of artifacts the computer 26 may determine the continuous band 24 at the sensor opening 16 is contaminated. The area of the artifacts may be compared to a threshold area, e.g., 5 percent of the field of view. The number of artifacts may be compared to a threshold amount, e.g., 10 artifacts. When the area and/or number of artifacts is greater than the threshold area and/or threshold amount, the computer 26 may determine the continuous band 24 at the sensor opening 16 is contaminated.

The computer 26 may be programmed to actuate the motor 20 and/or the pump 68, upon a determination that the continuous band 24 at the sensor opening 16 is more contaminated. For example, the computer 26 may transmit an instruction, e.g., via an in-vehicle 12 communication network, instructing the motor 20 to rotate, i.e., to advance the continuous band 24 in the advancing direction. Before, simultaneously with, or after actuation of the motor 20, the computer 26 transmits an instruction to the pump 68 to pump 68 fluid through the fluid nozzle 56.

The computer 26 may be programmed to navigate the vehicle 12 based on data received from the object-detection sensor 18. For example, the computer 26 may operate in the autonomous mode or the semi-autonomous mode based on the data received from the object-detection sensor 18. For example, the computer 26 may process the data using image recognition techniques to identify and maintain a lane of travel, to identify and avoid an object outside the vehicle 12, e.g., another vehicle, etc.

As used herein a computing device, e.g., a computer 26, includes a processor and a memory. The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data and execute the processes described herein.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors. The memory may store program instruction executable by the processor to perform the processes described herein.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
    a base having a sensor opening;
    an object-detection sensor aligned with the sensor opening;
    a motor and a guide each supported by the base and spaced from each other; and
    a continuous band that is flexible relative to and engaged with the motor and the guide, at least a portion of the continuous band being transparent and extending between the object-detection sensor and the sensor opening;
    the base having a second sensor opening spaced from the sensor opening; and
    a second object-detection sensor aligned with the second sensor opening.

2. The system as set forth in claim 1, further comprising a fluid nozzle supported by the base.

3. The system as set forth in claim 2, further comprising a pad contacting the continuous band.

4. The system as set forth in claim 3, wherein the motor is configured to drive the continuous band in an advancing direction, wherein the pad is positioned in the advancing direction relative to the fluid nozzle.

5. The system as set forth in claim 2, wherein the continuous band includes an inner surface and an outer surface, the inner surface facing the object-detection sensor and the outer surface facing the fluid nozzle.

6. The system as set forth in claim 5, further comprising a pad contacting the outer surface of the continuous band.

7. The system as set forth in claim 2, wherein the fluid nozzle faces inwardly into the base.

8. The system as set forth in claim 1, further comprising a pad contacting the continuous band.

9. The system as set forth in claim 1, wherein the continuous band extends around the driver and the guide.

10. The system as set forth in claim 1, wherein at least one of the motor and the guide are biased toward the continuous band.

11. The system as set forth in claim 1, wherein the base defines a slot elongated in a direction transverse to the continuous band, wherein one of the motor and the guide is engaged with the slot, and further comprising a spring biasing the one of the motor and the guide along the slot toward the continuous band.

12. The system as set forth in claim 1, further comprising a seal along the sensor opening and extending between the base and the continuous band.

13. The system as set forth in claim 12, wherein the sensor opening defines a periphery, and wherein the seal extends continuously around the periphery.

14. The system as set forth in claim 12, wherein the base includes a lip that extends from the seal to the sensor opening.

15. The system as set forth in claim 1, wherein the guide includes a curved surface, and the continuous band abuts the curved surface.

16. The system as set forth in claim 15, wherein the base includes an interior surface, and at least a portion of the curved surface of the guide matches the shape of the interior surface.

17. The system as set forth in claim 1, wherein the guide is a post that is rotatable relative to the base, and the continuous band abuts the post.

18. The system as set forth in claim 1, further comprising a liquid reservoir and a pump in communication with the liquid reservoir, and further comprising a computer programmed to control the motor and the pump based on a measurement of contamination of the continuous band.

19. The system as set forth in claim 1, wherein at least a portion of the continuous band is transparent and extends between the second object-detection sensor and the second sensor opening.

20. A system, comprising:
    a base having a sensor opening;
    an object-detection sensor aligned with the sensor opening;
    a motor and a guide each supported by the base and spaced from each other; and
    a continuous band that is flexible relative to and engaged with the motor and the guide, at least a portion of the continuous band being transparent and extending between the sensor and the sensor opening;
    the base defining a slot elongated in a direction transverse to the continuous band;
    one of the motor and the guide being engaged with the slot; and
    a spring biasing the one of the motor and the guide along the slot toward the continuous band.

* * * * *